United States Patent [19]
Olry

[11] Patent Number: 4,621,662
[45] Date of Patent: Nov. 11, 1986

[54] PROCESS AND APPARATUS FOR MANUFACTURING AXI-SYMMETRICAL THREE-DIMENSIONAL STRUCTURES

[75] Inventor: Pierre Olry, Bordeaux, France

[73] Assignee: Societe Europeenne de Propulsion, Puteaux, France

[21] Appl. No.: 685,056

[22] Filed: Dec. 20, 1984

[30] Foreign Application Priority Data

Dec. 28, 1983 [FR] France .................................. 83 20948

[51] Int. Cl.$^4$ ............................................. B32B 31/00
[52] U.S. Cl. ...................................... 138/129; 28/110; 138/137; 138/144; 156/180; 156/195; 156/425; 156/446; 242/2
[58] Field of Search .................................. 156/184–185, 156/187–188, 171–173, 175, 195, 425, 446; 28/110; 242/2–3; 138/144, 137, 129

[56] References Cited

U.S. PATENT DOCUMENTS

| | | | |
|---|---|---|---|
| 3,250,493 | 5/1966 | Burkley et al. | 242/2 X |
| 3,540,096 | 11/1970 | Porta | 28/110 |
| 3,673,024 | 6/1972 | Eriksson | 156/184 X |
| 3,909,893 | 10/1975 | Wilde | 28/110 |

FOREIGN PATENT DOCUMENTS

2324985 1/1974 Fed. Rep. of Germany ........ 28/110

*Primary Examiner*—David Simmons
*Attorney, Agent, or Firm*—Weingarten, Schurgin, Gagnebin & Hayes

[57] ABSTRACT

The present invention relates to a process for manufacturing an axi-symmetrical three-dimensional structure formed by superposed layers of fibrous material bonded together, said process comprising the following steps of:—bringing onto a rotary mandrel having the section of the structure to be manufactured, a tape of fibrous material whose width is several times less than the length of a generatrix of said structure:—winding the tape over the mandrel to form superposed layers, each layer being formed by successive turns of the tape of fibrous material, and—during winding, successively bonding the layers together by needling, said needling being effected at the place where the tape is superposed on the mandrel or on the previously formed layer. The invention also relates to an apparatus for carrying out said process.

16 Claims, 4 Drawing Figures

PROCESS AND APPARATUS FOR MANUFACTURING AXI-SYMMETRICAL THREE-DIMENSIONAL STRUCTURES

The present invention relates to the manufacture of axi-symmetrical dimensional structures, and more precisely of structures formed by superposed layers of fibrous material bonded together.

A particular, but non-limiting, application of the invention is the production of three-dimensional reinforced structures intended for manufacturing composite material components, particularly for nozzle exit cones.

A known technique for making three-dimensional structures of revolution with a view to such an application consists in superposing a plurality of layers of a two-dimensional fibrous material (felt or woven fabric for example) on a cylindrical mandrel, then in bonding the layers together by means of yarns passing through the whole stack thickness. This process, is in most cases, difficult to perform automatically, particularly when the stack is very thick. Moreover, when cylindrical three-dimensional structures are used for manufacturing nozzle exit cones, the shape of the component as machined (conical or bell shape profile) involves considerable material losses.

It is an object of the invention to provide a process for manufacturing three-dimensional structures of revolution which may be carried out simply and automatically whatever the thickness of the structure to be made.

It is also an object of the invention to provide a process which enables non-cylindrical structures of revolution to be rapidly and automatically made, particularly truncated cone structures or bell shaped structures, and more generally structures with nondevelopable surface.

According to the invention, the process comprises the following steps of:
bringing onto a rotary mandrel having the section of the structure to be manufactured, a tape of fibrous material whose width is several times less than the length of a generatrix of said structure,
winding the tape over the mandrel to form superposed layers, each layer being formed by successive turns of the tape of fibrous material, and
during winding, successively bonding the layers together by needling, said needling being effected at the place where the tape is superposed on the mandrel or on the previously formed layer.

Needling is effected over the whole width of the tape and perpendicularly thereto by means of an assembly of needles which is displaced longitudinally with respect to the mandrel, along a line reproducing a generatrix of the surface of the mandrel or of the structure during manufacture at a speed which is a function of the speed of rotation of the mandrel.

The depth and surface density of needling are preferably constant to give a uniform radial resistance to the structure.

It is a further object of the invention to provide an apparatus for carrying out the process defined hereinabove.

This object is attained by means of an apparatus incorporating a rotary mandrel comprising, according to the invention: a supply device adapted to bring a tape of fibrous material onto the rotary mandrel in order to form thereon superposed layers of fibrous material, each layer being formed by successive turns of said tape; a needle assembly extending over a length equal to the width of the tape, mobile longitudinally and mounted so that the needles may penetrate perpendicularly to the tape at the place where the latter is superposed on the mandrel or on the previously formed layer; and a device for actuating the needles to cause them to penetrate through the tape having arrived at said place.

Means are provided to move the needle assembly and the mandrel apart by a distance equal to the thickness of a needled layer, after the formation of each layer. Consequently, a constant depth of needling is maintained. Furthermore, by maintaining a constant speed of tape supply and a steady frequency of needle actuation, a constant volumic density of needling is obtained.

The needles are preferably mounted on a support which is movable longitudinally along a line which is parallel to the longitudinal profile of the mandrel or of the structure to be manufactured and which is coupled to a drive mechanism adapted for moving the needle support along this path at a speed depending on the speed of rotation of the mandrel.

The invention will be more readily understood on reading the following description with reference to the accompanying drawings, in which.

Figure 1:
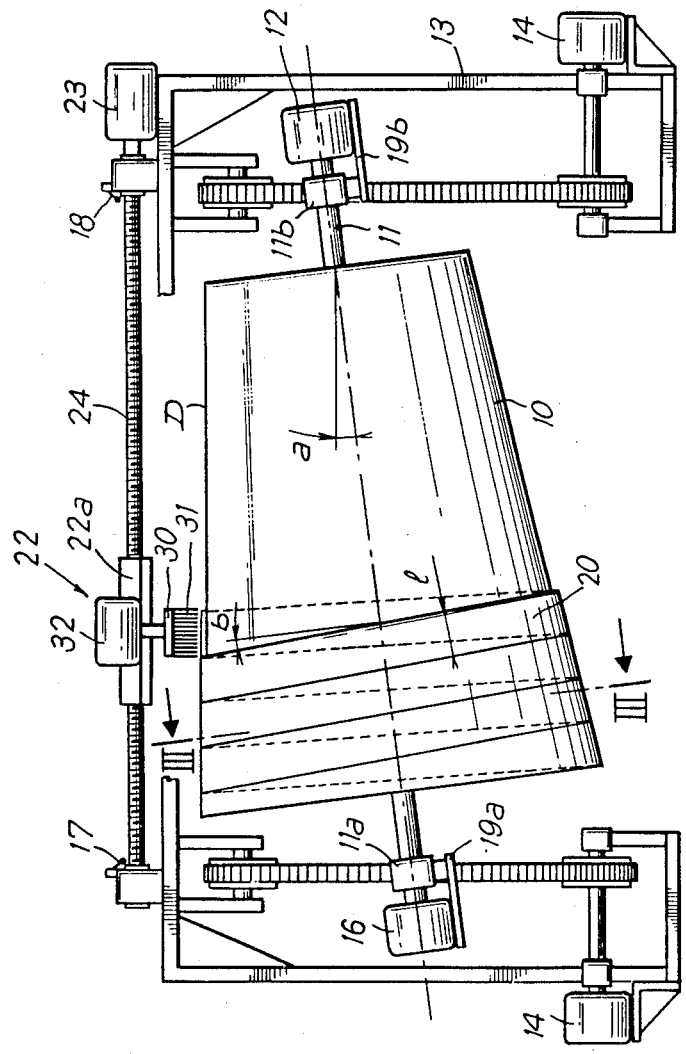
FIG. 1 is a very schematic view in elevation of an embodiment of an apparatus according to the invention.
Figure 2:
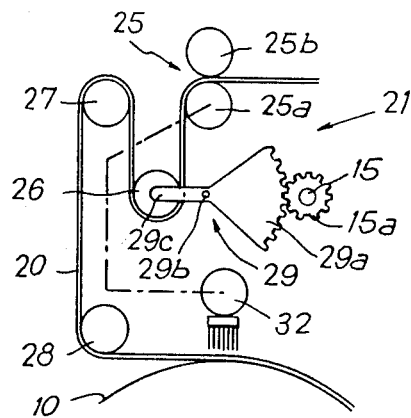
FIG. 2 is a very schematic partial view showing the supply device.
Figure 3:
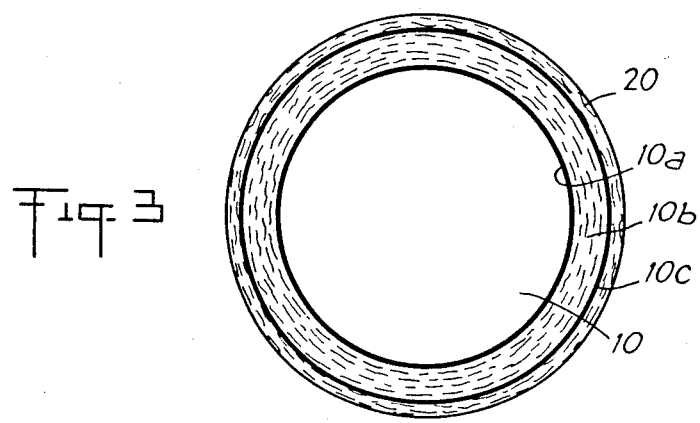
FIG. 3 is a view in section of the mandrel along plane III—III of FIG. 1.

Referring now to the drawings, FIGS. 1 to 3 very schematically show an apparatus for carrying out the process according to the invention for manufacturing a truncated cone of three-dimensional structure and annular transverse section.

A mandrel 10 in the form of a frustum of a cone is mobile in rotation about its axis 11 under the action of a D.C. motor 12. The mandrel is supported by a frame 13, the inclination of the axis of the mandrel with respect to the horizontal being adjustable in order to be set equal to the semi-vertex angle a of the frustum of cone of the structure to be manufactured. Consequently, the upper generatrix of the mandrel extends horizontally.

A tape 20 of fibrous material is drawn from a reel (not shown) by means of a supply device bringing the tape onto the mandrel at constant speed. The tape 20 comes tangentially into contact with the mandrel 10 (or with a layer previously formed thereon) at the level of the horizontal upper generatrix of the mandrel (or of the structure being formed).

The supply device 21 (shown only in FIG. 2) is mounted on a carriage 22 movable horizontally under the action of a motor 23 along a path parallel to the upper generatrix of the mandrel. In the embodiment illustrated, the motor 23 rotates a screw 24 in mesh with a block 22a fastened to the carriage 22, the motor 23 and the screw 24 being supported by the frame 13.

In the supply device, the tape 20 passes successively through a drawing press 25 formed by a pair of rollers 25a, 25b of which one is driven in rotation at a speed which determines the speed of supply Va of the tape. The tape 20 then passes beneath a tension roller 26 which may move freely in vertical direction, and over two guide rollers 27, 28. Carriage 22 is not shown in FIG. 2.

A needle board 30 is mounted on the carriage 22. The board 30 comprises one or more parallel rows of needles 31 which extend over a length equal to the width 1 of the tape 20. This board 30 is disposed at the level where the tape 20 is superposed on the mandrel 10 or on a layer previously wound thereon. A drive mechanism conventionally acts on the needle board 20 to displace the latter vertically in a reciprocating movement through the tape 20. This drive mechanism comprises a stroke control motor 32 of which the speed of rotation determines the frequency of needling, i.e. the number N of needling strikes per unit of time. This motor drives for example an eccentric rod system which acts on the needle board 30 and which determines the depth of needling.

The case of the tape coming horizontally into contact with the upper generatrix of the mandrel or of the structure being formed has been envisaged hereinbefore, with the needle board working vertically. As a variant, any other orientation of the tape at its tangential contact with the mandrel or the structure may be adopted, for example a vertical orientation, the needle board in that case working horizontally.

In the example illustrated, the tape 20 is wound circumferentially in contiguous turns and is needled as it is wound. It is necessary to relate to one another the speeds Va of supply of the tape 20, Vr of rotation of the mandrel 10, Vc of displacement in translation of the carriage 22 and the frequency of needling N.

As a function of the desired needling pitch (distance covered by the tape 20 between two successive needlings), the ratio of proportionality between the speed of rotation of the strike control motor 32 and the speed of rotation of the roller 25a for driving the tape 20 is determined. The roller 25a is then driven from the motor 32 via a variable speed drive system (not shown).

Furthermore, it is necessary to maintain the tangential speed of the mandrel 0 or of the structure being formed, at the level where the tape 20 comes into contact with the mandrel or a previously formed layer, equal to the speed Va. To this end, a control member 29 is used, which controls a rotary potentiometer 15 acting in turn on the supply of the motor 12 in order to regulate the speed of rotation of the mandrel. The control member 29 comprises a toothed sector 29a articulated at its vertex about a pin 29b (fixed on the carriage 22) and extended beyond its articulation by an arm 29c whose end is connected to the pin of the tension roller 26. The toothed sector 29a meshes with a gear 15a rotating with the potentiometer 15. In this way, any variation between the tangential speed of the mandrel and the speed of supply results in a vertical upward or downward displacement of the tension roller 26, therefore by a displacement in rotation of the potentiometer acting on the supply of the motor 12 in order to return to zero the variation in speed detected; the tangential speed of the mandrel 10 is thus controlled by that of supply of the tape 20.

Finally, winding with contiguous turns imposes a relation between the speed Vc of the carriage 22 and the speed of rotation Vr of the mandrel. To this end, an impulse transmitter 16 is mounted on the shaft of the motor 12 and delivers a signal which controls the supply of the D.C. motor 23. If b designates the angle of pseudo-helical winding of the tape 20 on the mandrel 10, one has the relation Vc=vr.1/cos b. When the width 1 of the tape 20 remains small with respect to the radius r of the frustum of cone where winding is produced, Vc is substantially equal to Vr.1.

On the contrary, when 1 is not negligible with respect to r, winding with contiguous turns becomes more delicate despite the capacity of deformation of the tape 20, all the more so as the semi-vertex angle a is large. In this case, the angle b may vary significantly from one end of the mandrel to the other since sin b= ½ r. To maintain the needle board 30 in a direction perpendicular to the tape 20 opposite the latter, it is then necessary to mount the board 30 so that it may pivot about a vertical axis as it is displaced in translation. This may be obtained by mounting the board 30 to pivot with respect to its vertical drive mechanism and by adjusting the position of the board in rotation by means of a template extending along the path thereof. It is also necessary to vary the speed Vc of the carriage 22 as a function of the variations of the angle b along the rectilinear path of this carriage. This may be obtained by giving the output signal from the impulse transmitter 16 a magnitude which is variable as a function of b.

The case of winding with contiguous turns has been envisaged hereinbefore. In that case it is necessary to offset the turns in axial direction in the successive layers in order to avoid weak zones being created by a continuity in radial direction of the surfaces of separation between contiguous turns.

As a variant, it is possible to avoid creating such weak zones by effecting a winding of each layer not by contiguous turns but with a partial overlapping of the adjacent turns, for example up to over one half of their width. Such a winding with overlapping is preferably effected in the event of the tape used having a relatively small thickness. The speed of the carriage 22 is still controlled as a function of the speed of rotation of the mandrel, for example by giving the output signal from the impulse transmitter 16 a coefficient representative of the desired rate of overlap.

Adjustable stops provided with microswitches 17, 18 are disposed on the frame 13 to control the reversal of direction of the motor 23 at the end of winding of each layer. Simultaneously, the axis of the mandrel is lowered with respect to the frame by a distance equal to the thickness of a needled layer. To this end, the pin 11 passes in bearings 11a, 11b which are mounted on supports 19a, 19b mobile vertically with respect to the frame 13 under the action of stepping motors 14 controlled in synchronism by signals generated by the carriage coming into contact with the stops 17, 18. In the example illustrated, the supports 19a, 19b are fast with endless chains meshing on gears, moved by the motors 14; worm gears may also be used. The progressive displacement of the mandrel 10 with respect to frame 13 makes it possible, on the one hand, always to bring the tape 20 tangentially to the surface of the structure being formed and at the level of the upper generatrix thereof and, on the other hand, to conserve a constant depth of needling.

Operation of the apparatus described hereinabove obviously follows from the foregoing.

The tape 20, constituted by fibers, may be in different forms, such as for example:
   a complex constituted by a woven fabric (satin or plain) on which has been needled with a low density of needling (pre-needling) a web of discontinuous fibers obtained by carding, or a web of continuous fibers obtained by overlapping cables or yarns;

- a complex constituted by a braided ribbon on which has been pre-needled a web of continuous or discontinuous fibers;
- a complex such as the two hereinabove in which the woven fabric or the braid is replaced by a knitted fabric;
- a web of discontinuous fibers only, obtained by carding and pre-needling, or continuous fibers, obtained by overlapping cables or yarns followed by a pre-needling;
- a woven fabric alone, constituted in warp and weft by yarns formed by continuous or discontinuous filaments; or
- a woven fabric alone, constituted in warp by yarns formed by continuous or discontinuous filaments and in weft by a sliver or a roving.

The fibers constituting the materials described hereinabove may all be natural, artificial or synthetic, organic or inorganic fibers, as such or heat-treated. The choice of the nature of the fibers depends on the application foreseen.

Concerning the manufacturing of reinforcing structures for composite materials intended to withstand considerably thermomechanical efforts, the most advantageous fibers are carbon fibers and ceramic fibers (alumina, silicon carbide ...) as well as the precursor fibers of these fibers or all fibers in an intermediate step between precursor fibers and the fibers which are completely treated thermally. When the three-dimensional structure is made from precursor or intermediate fibers, it subsequently undergoes the heat treatment intended to give the fibers the optimum mechanical properties. This latter modus operandi makes it possible not to break too many fibers during needling particularly in the case of the heat-treated fibers having too high moduli and too low transverse resistance to be needled without damage. Finally, needling may be proceeded from a complex of fibers combining the primary and final stages; for example, a woven fabric of high-resistance carbon fibers may be needled with a web of fibers of PAN (poly-acrylonitryl, precursor of carbon) stabilised to form a complex from which the tape 20 is cut out. A better characteristic of the carbon fibers is thus allied with a non-destructive needling as the barbs of the needles, covered with stabilized PAN, do not injure the carbon fibers.

During implementation of the process according to the invention, needling is effected simultaneously to winding. The needles 31 provided with barbs entrain a certain number of fibers perpendicularly to the plane of the tape 20; these fibers form a link perpendicular to the layers wound on the mandrel 10. In this way, a bond in a radial direction is created in addition to the circumferential and axial bonds at the level of the tape. Needling therefore ensures both the fixation of the tape as it is supplied with a view to aiming at the desired winding and the creation of the supplementary bond giving the structure obtained the three-dimensional character.

As set forth hereinabove, winding with successive turns in the case of non-cylindrical structures requires the use of a material having a certain capacity of deformation and in the form of a tape of small width with respect to the local radius of the structure being formed where winding is operated. This latter condition must not lead to the use of tapes of too small width for which winding (particularly edge to edge for contiguous turns) and needling would be difficult. In practice, it is desirable that the width of the tape be greater than 20 mm.

The constancy of the tape supply speed Va and of the needling frequency N ensures a constancy of the surface density of needling, i.e. a constant number of needle strikes 31 per surface unit. The constancy of the depth of needling, as resulting from the progressive lowering of the mandrel 10 after the winding of each layer, ensures in addition the constancy of the volumic density of needling, therefore the obtaining of a structure having uniform properties in the whole of its thickness.

To obtain an efficient bond between the layers, it is necessary that the needles pass not only through the tape which is offered, but also through at least a substantial part of the thickness of the subjacent layer. The depth of needling is thus preferably at least equal to twice the thickness of a needled layer and may reach several tens of times this thickness (for example up to 50 times).

In order to be able to needle the first layers on the mandrel, means must be provided to avoid the needles 31 abutting against the hard surface of the mandrel. Needling on a perforated table which is conventionally used cannot be applied in the case of truncated rotating mandrels or, a fortiori, mandrels having nondevelopable profiles such as contourned ones (cf. hereinafter with reference to FIG. 4).

In the case of truncated mandrels (FIG. 3), they are coated with an envelope 10a of reinforced elastomer (for example "Hypalon" reinforced with a "Nylon" fabric). This envelope is fixed by clips or staples at both ends of the mandrel. On this envelope is glued a second envelope (10b) formed by a base felt of sufficient thickness for the needles, during the first needling pass, to be able to penetrate over the depth of needling provided, without touching the mandrel. On the base felt, there is glued another envelope (10c) constituted by a thin foil, for example of polyvinyl chloride. During needling, the foil 10c is crossed by the needles but avoids too many fibers which come from the material of the tape 20 being incrusted in the polypropylene felt. At the end of needling, the elastomer envelope is unclipped and the mandrel is removed. The felt 10b is separated by peeling from the structure made, this peeling operation being made easy by the presence of foil 10c.

In the case of the mandrel and the structure to be made having a non-developable outer surface, the first envelope is for example a sheath of heat-retractable polyethylene which is positioned on the mandrel by heat-retraction and clipped at the two ends of the mandrel. Double-face adhesive tapes or tapes with mechanical hooking means are glued on the polyethylene envelope along generatrices of the mandrel in order to maintain thereon a base felt formed by a helical winding with contiguous turns of tapes of polypropylene felt. The base felt may be coated by a thin sheet of polyvinyl chloride.

Figure 4:
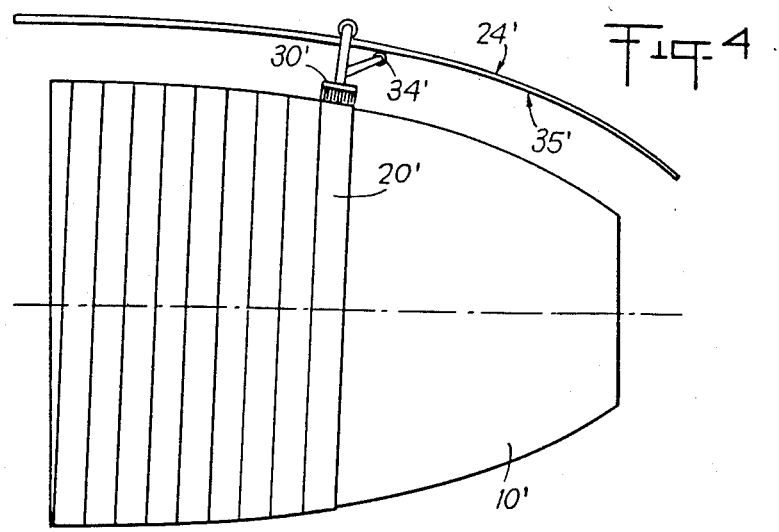
FIG. 4 is a very schematic, partial view in elevation of a variant embodiment of the apparatus of FIG. 1.

FIG. 4 illustrates a variant embodiment of the apparatus of FIGS. 1 and 3 in the case of the structure to be manufactured having a continued form, particularly for the purpose of producing nozzle exit cones.

The mandrel 10' has a section corresponding to that of the structure to be manufactured. The carriage bearing the tape supply device 20' and the needle board 30' is displaced along a guide 24' which extends parallel to the upper generatrix of the mandrel 10' (or of the structure being formed), the mandrel being able to be of horizontal axis.

Needling must be effected perpendicularly to the surface to be needled along the whole of the mandrel 10'. The needle board 30' is thus mobile in rotation about an axis perpendicular to the meridian plane containing the generatrix along which needling is effected, i.e. here, a horizontal axis perpendicular to the axis of the mandrel, in order to remain parallel to the plane tangential to the surface to be needled. The position of the board 30' is regulated by a sensor 34', for example a roller, adapted to follow a template 35' and mounted at the end of an arm connected to the board 30' at a point remote from the pivot axis of said arm.

In a variant, the orientation of the needle board may be controlled by a drive member receiving signals elaborated by a calculating device as a function of the section of the structure to be manufactured.

Still as a variant, parallelism between the board 30' bearing the needles and the surface to be needled may be maintained by controlling a displacement with pivoting of the axis of the mandrel in a vertical plane.

Finally, it will be noted that it is possible, during the manufacturing process, to insert between two layers of the structure reinforcing elements diposed so as to cross the turns formed by winding the tape, for example in a direction parallel to the generatrices of the structure. These reinforcing elements are made of fibrous material, for example in the form of rovings, slivers, cables, yarns, woven fabrics or braids, the constituent fibers being similar to those of the tape used for winding, i.e. in particular carbon fibers, ceramic fibers, or precursors of these fibers at a more or less elaborated stage.

What is claimed is:

1. A process for manufacturing a three-dimensional axi-symmetrical and non-cylindrical structure constituted by superposed and interbonded layers of fibrous material comprising the steps of:
    delivering onto a rotating mandrel having an axi-symmetrical and non-cylindrical profile corresponding to that of the structure to be manufactured a tape of a fibrous material having a width that is several times less than the length of a generatrix of said structure;
    winding the tape over the mandrel to form superposed layers in such a way that each of the layers is constituted by plural, successive turns of the tape of the fibrous material; and
    simultaneously with said winding step, interbonding the layers together by successively needling their constitutive turns by means of an assembly of needles which extend over a distance substantially equal to the width of said tape and longitudinally movable relative to the mandrel in order to perform said needling over the width of the layers in such a way as to be sequentially positioned at the location where the tape is delivered for needling the tape simultaneously as it is being delivered thereto and wound therearound substantially across the width of each of the layers.

2. The process of claim 1, wherein each layer is formed by winding the tape of fibrous material in contiguous turns.

3. The process of claim 1, wherein said assembly of needles is driven along a line reproducing a generatrix of the mandrel or of the structure during the manufacture thereof at a speed which is a function of the rotation speed of the mandrel.

4. The process of claim 1, wherein the depth of needling is constant.

5. The process of claim 1, wherein the surface density of needling is constant.

6. The process of claim 1, further including the step of introducing reinforcing elements of fibrous material between adjacent layers of the structure so as to cross the turns formed by winding the tape.

7. The process of claim 1, further including a base layer disposed on the mandrel before winding on the tape so as to allow penetration of the needles without damaging them during needling of the initial layers of the structure.

8. A process for manufacturing a three-dimensional axi-symmetrical and non-cylindrical structure constituted by superposed and interbonded layers of fibrous material comprising the steps of:
    delivering onto a rotating mandrel having an axi-symmetrical and non-cylindrical profile corresponding to that of the structure to be manufactured a tape of a fibrous material having a width that is several times less than the length of the generatrix of the said structure;
    winding the tape over the mandrel to form superposed layers in such a way that each of the layers is constituted by plural, successive turns of the tape of fibrous material;
    simultaneously with said winding step, simultaneously bonding the layers together by successively needling their constitutive turns onto the mandrel and onto the previously formed layers simultaneously as the tape is being delivered and wound onto the mandrel and onto the previously formed layers; and
    at the end of the winding and bonding of each layer, moving apart said mandrel said assembly of needles relatively by a distance equal to the thickness of a needled layer to provide a constant needling depth during the whole manufacturing process.

9. The process of claim 8, wherein each layer is constituted as successive turns of the tape of fibrous material, and wherein said assembly of needles is driven longitudinally with respect to the mandrel along the line reproducing a generatrix of the mandrel during the manufacture thereof.

10. An apparatus for manufacturing a three-dimensional, axis-symmetrical and non-cylindrical structure constituted as superposed layers of fibrous material bonded together, comprising:
    a rotary mandrel having a three-dimensional axi-symmetrical and non-cylindrical profile corresponding to that of the structure to be manufactured;
    supply means for delivering a tape of fibrous material onto said mandrel in order to so form thereon said superposed layers as plural, successive turns of said tape;
    an assembly of needles extending over a length substantially equal to the width of said tape;
    first driving means for so moving said assembly of needles and to said mandrel relatively to each other as to allow the needles to penetrate perpendicularly to the tape at the location where said tape is superposed onto the mandrel and onto the previously formed layer; and
    second driving means for so moving said assembly of needles and to said mandrel relatively to each other as to trace along a locus line reproducing a generatrix of the surface of the mandrel and of the structure being manufactured.

11. The apparatus of claim 10, further including third driving means operative after the formation of each of said layers for moving said assembly of needles relative to said mandrel a preselected distance apart selected to be equal to the thickness of an already needled layer.

12. The apparatus of claim 10, wherein said tape supply means includes means for delivering the tape at a constant speed, and a control device for controlling the rotation speed of the mandrel so that the tangential speed thereof and of the structure being formed, at the level where the tape is delivered onto the mandrel and onto a previously formed layer, is equal to the speed of supply of the tape.

13. The apparatus of claim 10, wherein said second driving means moves said assembly of needles along said locus line at a speed depending on the rotation speed of the mandrel.

14. The apparatus of claim 10, further including needle support means for pivoting said assembly of needles about an axis perpendicular to the meridian plane and containing said locus line along which said assembly of needles is driven.

15. A three-dimensional, axi-symmetrical and non-cylindrical structure constituted by superposed and interbonded layers of fibrous material produced by the process of delivering onto a rotating mandrel having an axi-symmetrical and non-cylindrical profile corresponding to that of the structure to be manufactured a tape of the fibrous material having a width that is several times less than the length of the generatrix of said structure produced by the steps of:

winding the tape over the mandrel to form superposed layers in such a way that each of the layers is constituted by plural, successive turns of the tape of the fibrous material;

simultaneously with said winding step, interbonding the layers together by successively needling their constitutive turns at the location where the tape is sequentially delivered onto the mandrel and onto the previously formed layer to form a three-dimensional, axis-symmetrical and non-cylindrical structure; and removing said structure off of said mandrel after said interbonding step is completed.

16. A three-dimensional axi-symmetrical and non-cylindrical structure constituted by superposed and interbonded layers of fibrous material manufactured produced by the steps of:

delivering onto a rotating mandrel having an axi-symmetrical and non-cylindrical profile corresponding to that of the structure to be manufactured a tape of a fibrous material having a width that is several times less than the length of a generatrix of a structure;

winding the tape over the mandrel to form superposed layers in such a way that each of the layers is constituted by plural, successive turns of the tape of the fibrous material;

simultaneously with said winding step, interbonding the layers together by successively needling their constitutive turns over the width of the layers as the tape is delivered onto the mandrel and onto the previously formed layer to sequentially form said structure;

at the end of the winding and bonding of each layer, relatively moving apart said mandrel and said assembly of needles by a distance equal to the thickness of a needled layer to provide a constant needling depth; and removing the structure from the mandrel after a predetermined number of layers has been built up.

* * * * *

UNITED STATES PATENT AND TRADEMARK OFFICE
CERTIFICATE OF CORRECTION

PATENT NO. : 4,621,662

DATED : November 11, 1986

INVENTOR(S) : Pierre Olry

It is certified that error appears in the above-identified patent and that said Letters Patent is hereby corrected as shown below: Title Page:

ABSTRACT, line 8, "structure:-" should read --structure;--.

Column 2, line 32, "avery" should read --a very--.

Column 3, line 3, "width 1" should read --width $\ell$--.

Column 3, line 39, "mandrel 0" should read --mandrel 10--.

Column 3, line 68, "width 1" should read --width $\ell$--.

Column 4, line 3, "when 1" should read --when $\ell$--.

Column 5, line 24, "considerably" should read --considerable--.

Column 5, line 24, "efforts," should read --effects,--.

Column 6, line 26, "contourned" should read --contoured--.

UNITED STATES PATENT AND TRADEMARK OFFICE
CERTIFICATE OF CORRECTION

PATENT NO. : 4,621,662

DATED : November 11, 1986

INVENTOR(S) : Pierre Olry

It is certified that error appears in the above-identified patent and that said Letters Patent is hereby corrected as shown below:

Column 8, line 46, "axis-symmetrical" should read --axi-symmetrical--.

Column 10, line 6, "axis-symmetrical" should read --axi-symmetrical--.

Signed and Sealed this

Eighth Day of March, 1988

*Attest:*

DONALD J. QUIGG

*Attesting Officer*         *Commissioner of Patents and Trademarks*